(12) United States Patent
Kimura

(10) Patent No.: US 8,259,238 B2
(45) Date of Patent: Sep. 4, 2012

(54) OPTICAL UNIT AND PROJECTION-TYPE LIQUID CRYSTAL DISPLAY DEVICE USING THE SAME

(75) Inventor: Nobuyuki Kimura, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 247 days.

(21) Appl. No.: 12/622,226

(22) Filed: Nov. 19, 2009

(65) Prior Publication Data

US 2010/0214500 A1 Aug. 26, 2010

(30) Foreign Application Priority Data

Feb. 25, 2009 (JP) ................................. 2009-042460

(51) Int. Cl.
   *G02F 1/1335* (2006.01)
   *G02F 1/00* (2006.01)

(52) U.S. Cl. ........... 349/9; 349/5; 349/7; 349/8; 349/96; 348/750; 348/751

(58) Field of Classification Search .............. 349/5, 7–9, 349/96; 348/750–751
   See application file for complete search history.

(56) References Cited

U.S. PATENT DOCUMENTS

| | | | | |
|---|---|---|---|---|
| 5,105,265 A | * | 4/1992 | Sato et al. | 348/757 |
| 6,327,093 B1 | * | 12/2001 | Nakanishi et al. | 359/634 |
| 6,513,934 B1 | * | 2/2003 | Okuyama | 353/31 |
| 2002/0015119 A1 | * | 2/2002 | Takizawa | 349/58 |
| 2009/0109355 A1 | * | 4/2009 | Ishihara et al. | 349/8 |

FOREIGN PATENT DOCUMENTS

| | | |
|---|---|---|
| JP | 09-105901 | 4/1997 |
| JP | 2007-033746 | 2/2007 |

* cited by examiner

*Primary Examiner* — Jessica M Merlin
(74) *Attorney, Agent, or Firm* — McDermott Will & Emery LLP

(57) ABSTRACT

An optical unit is provided which includes inorganic polarizing plates used as output polarizing plates. Even if a defect such as a flaw or a pinhole is present in the polarizing plate, the defect is not projected on the display screen. Instead of output polarizing plates for liquid crystal panels for R, G, and B, a common polarizing plate for R, G, and B is disposed on the output side of a photosynthesis prism. A color selective polarization rotator which rotates the polarization of light of a selected wavelength band is disposed between the photosynthesis prism and the common polarizing plate. Or, alternatively, instead of output polarizing plates for R and G to be individually disposed along with an output polarizing plate for B, a common output polarizing plate for R and G is disposed on the output side of the photosynthesis prism.

4 Claims, 5 Drawing Sheets

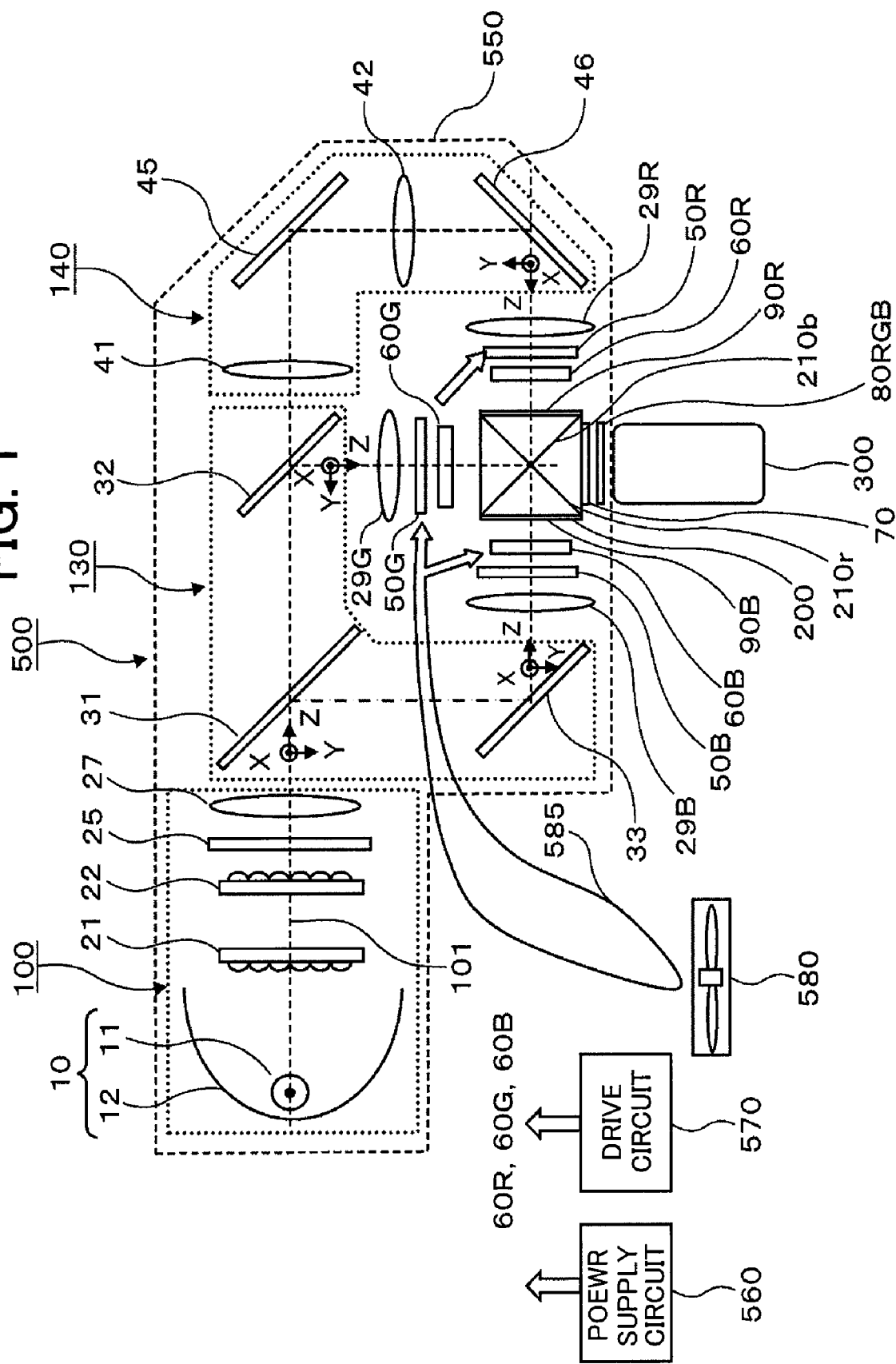

FIG. 4
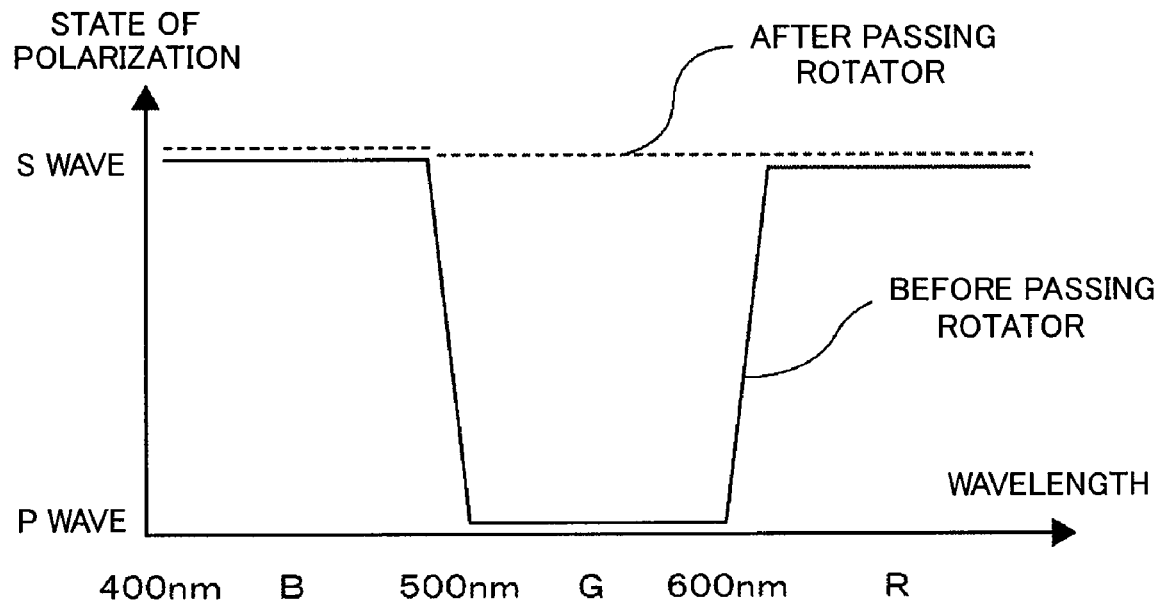
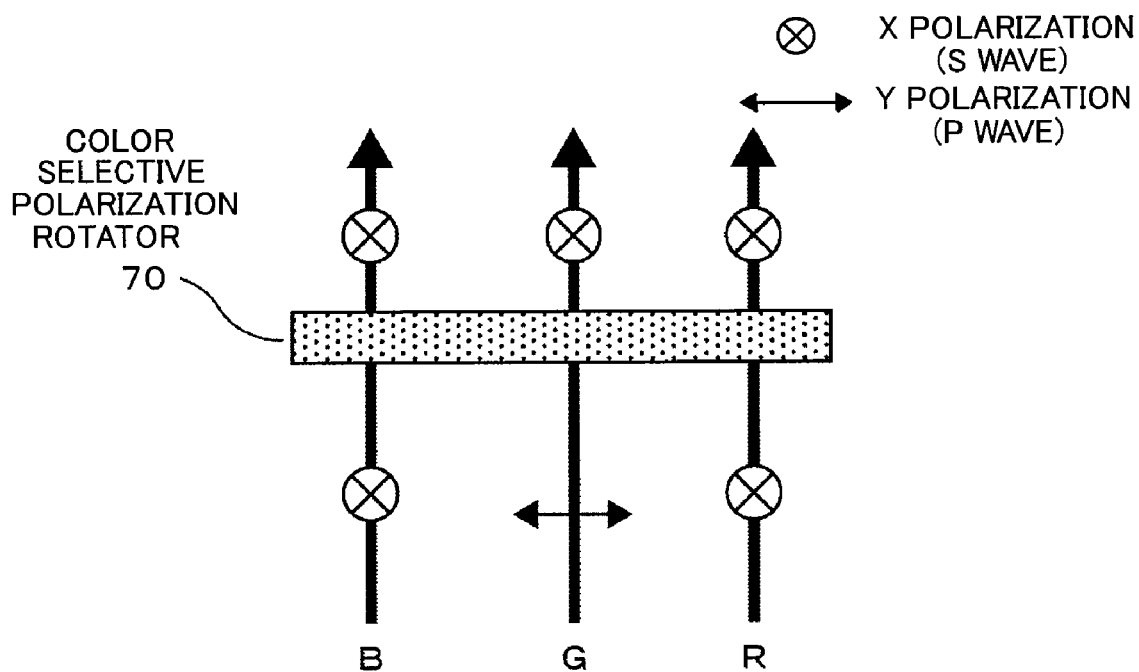

OPTICAL UNIT AND PROJECTION-TYPE LIQUID CRYSTAL DISPLAY DEVICE USING THE SAME

CLAIM OF PRIORITY

The present application claims priority from Japanese patent application serial No. JP 2009-042460, filed on Feb. 25, 2009, the content of which is hereby incorporated by reference into this application.

BACKGROUND OF THE INVENTION (1) Field of the Invention

The present invention relates to an optical unit which, according to a video signal, intensity-modulates light emitted from a light source using transmissive liquid crystal panels and which enlarges and projects optical images formed on the liquid crystal panels, and more particularly, to the structure of output polarizing plates of the transmissive liquid crystal panels.

(2) Description of the Related Art

A projection-type display device has been known which includes an optical unit accommodated in an enclosure together with a drive circuit, a power supply circuit, and a cooling fan, the optical unit intensity-modulating, by using light valves according to a video signal, light emitted from a light source and enlarging and projecting formed optical images.

Generally, in a related-art projection-type display device including transmissive liquid crystal panels (hereinafter referred to simply as "liquid crystal panels") to be used as light valves, polarizing plates for different polarization directions (for example, mutually perpendicular directions) are provided upstream and downstream (on the light input side and the light output side) of each of the liquid crystal panels. The polarizing plates are absorption-type polarizing plates formed of a uniaxially-stretched organic film prepared by uniaxially stretching a polymer film with low temperature resistance. The absorption-type polarizing plates generate heat by absorbing unnecessary polarized light, so that they are, along with the liquid crystal panels with low heat resistance, cooled by cooling fans for reliability enhancement. An output polarizing plate to be disposed on the light output side of a liquid crystal panel, in particular, absorbs most light when black is displayed, so that its heat resistance is required to be enhanced. Under such circumstances, devices have been put in use which include polarizing plates formed of an inorganic material of high heat resistance. The wire-grid type polarizing plate disclosed in JP-A No. 2007-33746 is among such known inorganic polarizing plates.

When external air is blown to an optical component, for example, a liquid crystal panel by a cooling fan, dust contained in the air may attach to the liquid crystal panel. Dust attached to the liquid crystal panel may be displayed as a black dot on the screen to degrade the quality of image display. JP-A No. H09-105901 discloses a configuration in which a liquid crystal panel is supported by a support frame and is placed in a sealed state with its front and back sides covered with a front side glass and a back side glass also supported, at their peripheries, by the support frame.

SUMMARY OF THE INVENTION

An inorganic polarizing plate like the one disclosed in JP-A No. 2007-33746 may have flaws and pinholes generated on or in its inorganic film surface during a manufacturing process. If an output polarizing plate disposed immediately downstream of a liquid crystal panel has such flaws or pinholes, which are free of polarization, they will be projected as bright spots on the screen to degrade the quality of image display on the screen. During a manufacturing process of inorganic polarizing plates, it is difficult to completely prevent the generation of such flaws and pinholes.

Even though, in the configuration disclosed in JP-A No. H09-105901, consideration is given to the prevention of dust from attaching to liquid crystal panels, other optical components such as polarizing plates are not taken into consideration in this regard. In cases where a polarizing plate is disposed on the output side of a liquid crystal panel, the polarizing plate also requires a measure to prevent dust from attaching thereto. In the configuration according to JP-A No. H09-105901, no consideration is given to flaws and pinholes which may be formed on or in inorganic polarizing plates, either. Once a flaw or a pinhole is formed on or in an inorganic polarizing plate, it cannot be removed like dust. Placing the polarizing plate in a sealed state using glass plates serves no use. It is not possible to remove a flaw or a pinhole by blowing air using a fan.

The present invention has been made in view of the above problems, and it is an object of the invention to provide an optical unit which can reduce the effect on image projection of a flaw or a pinhole, if present on or in an inorganic output polarizing plate included in the optical unit, and can generate satisfactory image display, and a projection-type liquid crystal display device using the optical unit.

According to an embodiment of the present invention, there is provided an optical unit comprising: an illumination optics system which outputs substantially white light aligned in a predetermined polarization direction; a light separation optics system which separates the substantially white light into light of three colors R (red), G (green), and B (blue); liquid crystal panels for R, G, and B light, respectively, which form R, G, and B optical images by optically modulating polarized R, G, and B light according to a video signal; a photosynthesis prism which optically synthesizes the optical images; and a projection lens which enlarges and projects the synthesized optical images. In the optical unit: instead of output polarizing plates for R, G, and B light to be disposed on output sides of the liquid crystal panels, a common output polarizing plate for R, G, and B light is disposed on an output side of the photosynthesis prism; and a color selective polarization rotator which rotates polarization of light of a selected wavelength band is disposed between the photosynthesis prism and the common output polarizing plate.

According to another embodiment of the invention, in the optical unit: instead of output polarizing plates for R and G light to be disposed, along with an output polarizing plate for B light disposed on an output side of the liquid crystal panel for B light, on output sides of the liquid crystal panels for R and G light, a common output polarizing plate for R and G light is disposed on an output side of the photosynthesis prism; and a color selective polarization rotator which rotates polarization of light of a selected wavelength band is disposed between the photosynthesis prism and the common output polarizing plate.

According to still another embodiment of the invention, in the optical unit: a λ/2 wave plate is provided on an incident surface, among incident surfaces of the photosynthesis prism, for each of the R light and the B light; and the color selective polarization rotator rotates polarization of the G light. According to still another embodiment of the invention, in the optical unit, the common output polarizing plate is an inorganic polarizing plate.

According to still another embodiment of the invention, there is provided a projection-type liquid crystal display device comprising the optical unit, a drive circuit, a cooling fan, and a power supply circuit.

The present invention can provide an optical unit and a projection-type liquid crystal display device using the optical unit. The optical unit can reduce, even if an output polarizing plate included therein has a defect such as a flaw or a pinhole, the effect of such a flaw or a pinhole on image projection on the screen compared with when an output polarizing plate of a related art is used and can provide better image display than before.

BRIEF DESCRIPTION OF THE DRAWINGS

These and other features, objects and advantages of the present invention will become more apparent from the following description when taken in conjunction with the accompanying drawings wherein:

FIG. 1 is a diagram showing an overall configuration of an optical unit and a projection-type liquid crystal display device according to a first embodiment of the invention;

FIG. 4 shows a characteristic of a color selective polarization rotator; and

DETAILED DESCRIPTION OF THE EMBODIMENTS

Figure 2A:
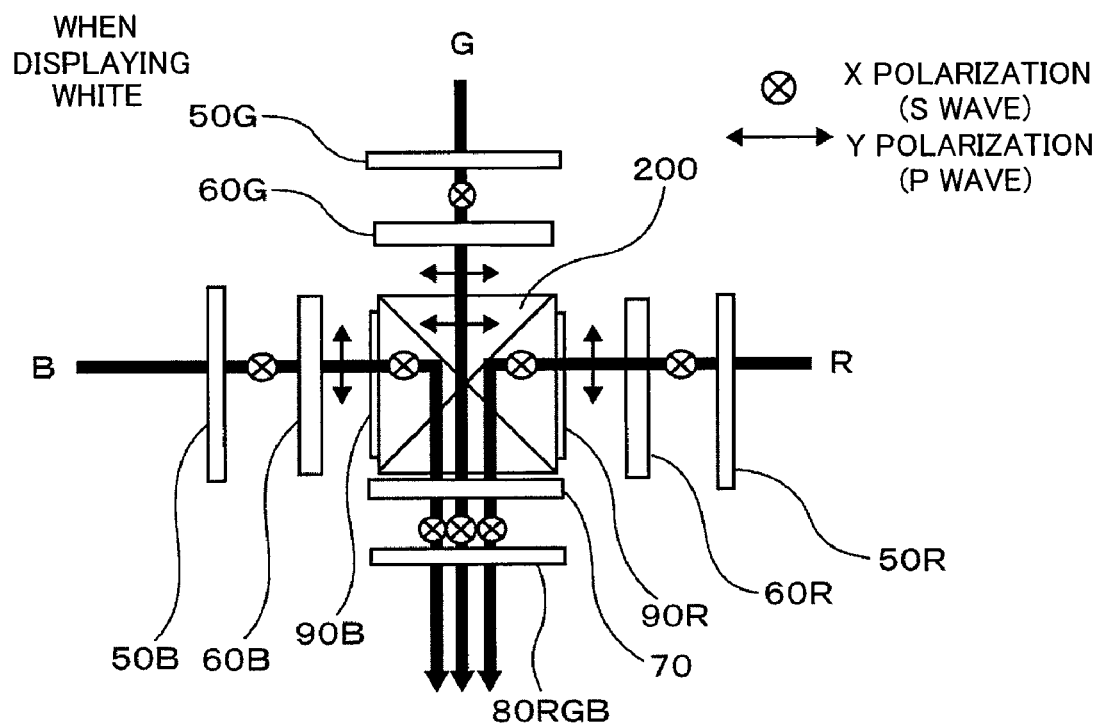
FIGS. 2A and 2B are detailed configuration diagrams of a portion around liquid crystal panels of the optical unit according to the first embodiment.

Embodiments of the present invention will be described below with reference to drawings. In the drawings referred to, like elements are assigned like reference numerals.

First Embodiment

First, an optical unit and a projection-type liquid crystal display device using the optical unit according to a first embodiment of the present invention will be described, then a configuration around liquid crystal panels will be described in detail.

FIG. 1 is a diagram showing an overall configuration of the optical unit and the projection-type liquid crystal display device according to the first embodiment of the invention. In FIG. 1, each element associated with a color-specific light path is denoted by a reference numeral postfixed with a corresponding letter R, G, or B. Other elements are each denoted by a reference numeral without any color-representing postfix. Also, for the clarification of polarization directions, a Cartesian coordinate system is employed. Namely, in this specification, an optical axis 101 is defined as a Z axis; an axis extending perpendicularly to the Z axis in a plane parallel to the plane of FIG. 1 is defined as a Y axis; and an axis extending perpendicularly to the plane of FIG. 1 is defined as an X axis. A direction along the X axis is referred to as an "X direction," and a direction along the Y axis is referred to as a "Y direction." Light polarized in the X direction is referred to as "X-polarized light," and light polarized in the Y direction is referred to as "Y-polarized light."

Referring to FIG. 1, the optical system of the projection-type liquid crystal display device includes an illumination optics system 100, a light separation optics system 130, a relay optics system 140, three field lenses 29 (29R, 29G, and 29B), three transmissive liquid crystal panels 60 (60R, 60G, and 60B), a photosynthesis prism 200 used as a photosynthetic means, and a projection lens 300 used as a projection means. The liquid crystal panels 60 are provided with incident light polarizing plates 50 (50R, 50G, and 50B) disposed on their respective incident sides, a color selective polarization rotator 70, and an output polarizing plate 80 (80RGB), which is common for the three colors, the last mentioned two being disposed on the output side of the photosynthesis prism 200. These optical elements are mounted on a base body 550 to make up the optical unit 500. The optical unit 500 along with a drive circuit 570 to drive the liquid crystal panels 60, a cooling fan 580 to cool the liquid crystal panels 60, and a power supply circuit 560 to supply various circuits with power makes up the projection-type liquid crystal display device mounted in an enclosure, not shown.

The configuration of each section of the projection-type liquid crystal display device will be described below.

The illumination optics system 100 that uniformly illuminates the liquid crystal panels 60 that are image display elements has a light source unit 10 including a lamp (light source) 11 and a reflector 12, a first lens array 21 and a second lens array 22 which make up an optical integrator, a polarization conversion element 25, and a collecting lens (superimposing lens) 27. The light separation optics system 130 that separates substantially white light coming from the illumination optics system 100 into light of the three primary colors has two dichroic mirrors 31 and 32, and a reflection mirror 33 which changes the direction of a light path. The relay optics system 140 has a first release lens 41 which is a field lens, a second release lens 42 which is a relay lens, and two reflection mirrors 45 and 46 which change the direction of a light path.

Light emitted from the lamp 11 is reflected by the reflector 12 having, for example, a rotational parabolic surface to cause the light to be emitted as a light beam approximately parallel to the optical axis 101. The light beam then enters a polarization conversion integrator. The polarization conversion integrator includes an optical integrator which, having the first lens array 21 and the second lens array 22, effects uniform illumination and the polarization conversion element 25 including a polarizing beam splitter which converts polarized light into linear polarized light by controlling the polarization direction of light into a predetermined direction.

The light coming from the lens array 22 is aligned, by the polarization conversion element 25, into a predetermined polarization direction, for example, linear X-polarized light (light polarized in the X-direction that is perpendicular to the plane of FIG. 1). The projection images of the lens cells of the first lens array 21 are superimposed on the liquid crystal panels 60 by the collecting lens 27, field lenses 29G and 29B, relay optics system 140, and field lens 29R. In this manner, light emitted by a lamp (light source) and polarized in random directions can be aligned as light polarized in a predetermined direction (X-polarized light, in the present example) so as to uniformly illuminate the liquid crystal panels.

In the light separation optics system 130, the substantially white light emitted from the illumination optics system 100 is separated into light of the three primary colors, i.e. B light (blue-band light), G light (green-band light), and R light (red-band light), and is guided to the light paths (i.e. B-light, G-light and R-light paths) leading to the corresponding liquid crystal panels 60 (60B, 60G, and 60R). Namely, the B light reflected by the dichroic mirror 31 is reflected by the reflection mirror 33 and enters the liquid crystal panel 60B for B light via the field lens 29B and the incident light polarizing plate 50B (B-light path). The G light and R light is transmitted through the dichroic mirror 31 to be then separated, by the dichroic mirror 32, into the G light and the R light. Namely, the G light is reflected by the dichroic mirror 32 and enters the liquid crystal panel 60G for G light via the field lens 29G and the incident light polarization plate 50G (G-light path). The R light is transmitted through the dichroic mirror 32 and enters the relay optics system 140.

The R light having entered the relay optics system 140 is collected (converged) in a neighborhood of the second release lens 42 by the first release lens 41 that is a field lens via the reflection mirror 45, and is then transmitted toward the field lens 29R. Subsequently, the R light is aligned, by the field lens 29R, to be approximately parallel to the optical axis, and then enters the liquid crystal panel 60R for R light via the incident light polarizing plate 50R (R-light path).

The liquid crystal panels 60 (60R, 60G, and 60B) driven by the drive circuit 570 receive X-polarized light of the three colors (RGB) from the light separation optics system 130 where the degree of light polarization has been enhanced by the incident light polarizing plates 50 (50R, 50G, and 50B) having a transmission axis along the X direction; modulate (optical intensity modulation) the light according to a color video signal; and form Y-polarized optical images of the three colors.

The Y-polarized optical images of the three colors enter the photosynthetic prism 200 serving as a photosynthesis means. At this time, the optical image of the G light enters the photosynthesis prism 200 as it is as a Y-polarized image (P-polarized with respect to the dichroic film surfaces of the photosynthesis prism 200). In the B-light and R-light paths, λ/2 wave plates 90B and 90R are provided between the liquid crystal panel 60B and the photosynthesis prism 200 and between the liquid crystal panel 60R and the photosynthesis prism 200, respectively, so that the Y-polarized optical images of the B light and R light enter the photosynthesis prism 200 after being converted into X-polarized images, respectively (S-polarized with respect to the dichroic film surfaces for color synthesis of the photosynthesis prism 200). This configuration has been employed by taking into consideration spectral characteristics of the dichroic films 210. Namely, so-called SPS synthesis is performed for efficient photosynthesis to obtain P-polarized G light, and S-polarized R light and B light.

The photosynthesis prism 200 has four right-angle prisms put together to form interfacial surfaces over which a dichroic film (dielectric multilayer film) 210b to reflect B light and a dichroic film (dielectric multilayer film) 210r to reflect R light are formed such that the dichroic films 210b and 210r cross each other in an approximate "X" shape. The photosynthesis prism 200 has three incident surfaces. The B light and R light (S-polarized with respect to the dichroic film surfaces) reaching an opposing pair of incident surfaces of the photosynthesis prism 200 are reflected by the mutually crossing dichroic film 210b for B light and dichroic film 210r for R light, respectively. The G light (P-polarized with respect to the dichroic film surfaces) reaching the middle incident surface further advances linearly. As a result, the optical images of the three colors are optically synthesized causing a colored image (synthesized light) to be outputted from the output surface of the photosynthesis prism 200.

The synthesized light outputted from the photosynthesis prism 200 enters the color selective polarization rotator 70 and the output polarizing plate 80RGB common for the three colors. The color selective polarization rotator 70 is an element to carry out polarization rotation for light of a selected wavelength band. In the present case, the color selective polarization rotator 70 converts the Y-polarized (P-polarized) incident G light into X-polarized (S-polarized) G light while allowing the X-polarized (S-polarized) incident B light and R light to pass as it is. As a result, the G light, B light, and R light having passed the color selective polarization rotator 70 is aligned as X-polarized (S-polarized) light. Thus, using the color selective polarization rotator 70 allows the G light, B light, and R light to enter the output polarizing plate 80RGB in a state of being aligned in a same direction.

The output polarizing plate 80RGB is an inorganic polarizing plate to transmit light in the X direction. It functions to remove unnecessary polarization components (Y-polarized light in the present case) so as to enhance image contrast. Being formed of an inorganic material, the output polarizing plate 80RGB is highly heat-resistant and has a long life. There are cases in which a metallic film formed on an inorganic polarizing plate has such defects as flaws and pinholes. Since the output polarizing plate 80RGB is disposed on the output side of the photosynthesis prism 200 distantly spaced from the liquid crystal panels 60R, 60G, and 60B, even if it has flaws or pinholes, the flaws or pinholes are out of focus on the display screen. That is, they are not projected on the display screen.

The synthesized light outputted from the output polarizing plate 80RGB is projected on a screen (not shown) by the projection lens 300 that may be, for example, a zoom lens. The cooling fan 580 sends cooling air through a flow passage 585 designed to send the cooling air to, for example, the incident light polarizing plates 50, liquid crystal panels 60, and output polarizing plate 80RGB so as to cool the parts as their temperatures rise by absorbing part of the light radiated from the light source unit 10.

Figure 2B:
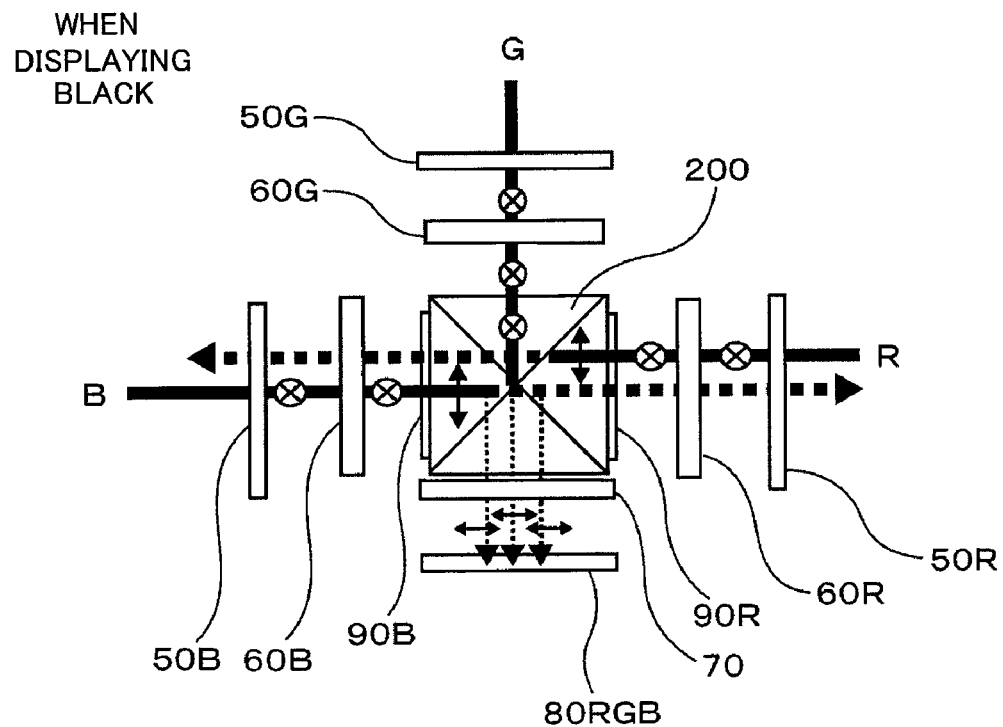

FIGS. 2A and 2B are detailed configuration diagrams of a portion around the liquid crystal panels of the optical unit according to the first embodiment of the present invention. In FIG. 2A, how the light of the three colors is polarized when white is displayed is shown. In FIG. 2B, how the light of the three colors is polarized when black is displayed is shown.

As described above, X-polarized (S wave) light of the three colors is inputted from the incident light polarizing plates 50R, 50G, and 50B to the liquid crystal panels 60R, 60G, and 60B, respectively. When white is displayed as shown in FIG. 2A, Y-polarized (P wave) optical images of the three colors are formed on the liquid crystal panels 60 (60R, 60G, and 60B), respectively. The optical images thus formed are inputted to the photosynthesis prism 200. At that time, the R light and the B light is converted into X-polarized (S wave) light by the λ/2 wave plates 90R and 90B to undergo SPS synthesis. Of the synthesized light outputted from the photosynthesis prism 200, the Y-polarized (P wave) G light is converted into X-polarized (S wave) light by the color selective polarization rotator 70, so that the light of all the three colors is aligned as X-polarized (S wave) light. Subsequently, the light of the three colors is inputted to the projection lens 300 after unnecessary Y-polarized (P wave) components are removed by the output polarizing plate 80RGB that transmits light in the X direction.

When black is displayed as shown in FIG. 2B, the X-polarized (S wave) light of the three colors inputted from the incident light polarizing plates 50R, 50G, and 50B to the liquid crystal panels 60 (60R, 60G, and 60B) is outputted as it is from the liquid crystal panels 60 (60R, 60G, and 60B). The G light that is X-polarized (S wave) light then passes the photosynthesis prism 200 as it is to be then converted into Y-polarized light (P wave) by the color selective polarization rotator 70. The G light thus converted into Y-polarized light (P wave) then enters the output polarizing plate 80RGB. The R light and the B light that is also X-polarized (S wave) light enters the photosynthesis prism 200 after being converted into Y-polarized (P wave) light by the λ/2 wave plates 90R and 90B, respectively. Even though part of the R light and the B light thus inputted to the photosynthesis prism 200 is reflected, most of the R light and the B light advances, owing to spectral characteristics of the dichroic films formed in the photosynthesis prism 200, linearly to enter the mutually opposing liquid crystal panels 60B and 60R. The part of the R light and B light reflected by the dichroic films passes the color selective polarization rotator 70 and enters the output polarizing plate 80RGB. The output polarizing plate 80RGB that transmits light in the X direction blocks the Y-polarized (P wave) G light, the part of the Y-polarized (P wave) R light, and the part of the Y-polarized (P wave) B light.

As described above, since the output polarizing plate 80RGB is distantly spaced from the liquid crystal panels 60R, 60G, and 60B, even if it has defects such as flaws or pinholes, such flaws or pinholes are not projected on the display screen.

The color selective polarization rotator 70 and the output polarizing plate 80RGB used in the present embodiment will be described below.

FIG. 4 shows a characteristic of the color selective polarization rotator 70. The color selective polarization rotator 70 selectively rotates the direction of polarization of a visible light beam of a specific color (wavelength band) 90 degrees. Namely, the color selective polarization rotator 70 functions as a λ/2 wave plate selectively for visible light of a specific wavelength band. In the present embodiment, it selectively rotates the polarization of G light of a wavelength band of about 500 to 600 nm without affecting the polarization of B light and R light of different wavelength bands. Referring to FIG. 2A, the G light that is P-polarized before entering the color selective polarization rotator 70 is S-polarized after passing the color selective polarization rotator 70. The B light and the R light that is S-polarized before entering the color selective polarization rotator 70 is unchangedly S-polarized after passing the color selective polarization rotator 70. Thus, all the R, G, and B light is in an S-polarized state after passing the color selective polarization rotator 70.

Figure 5:
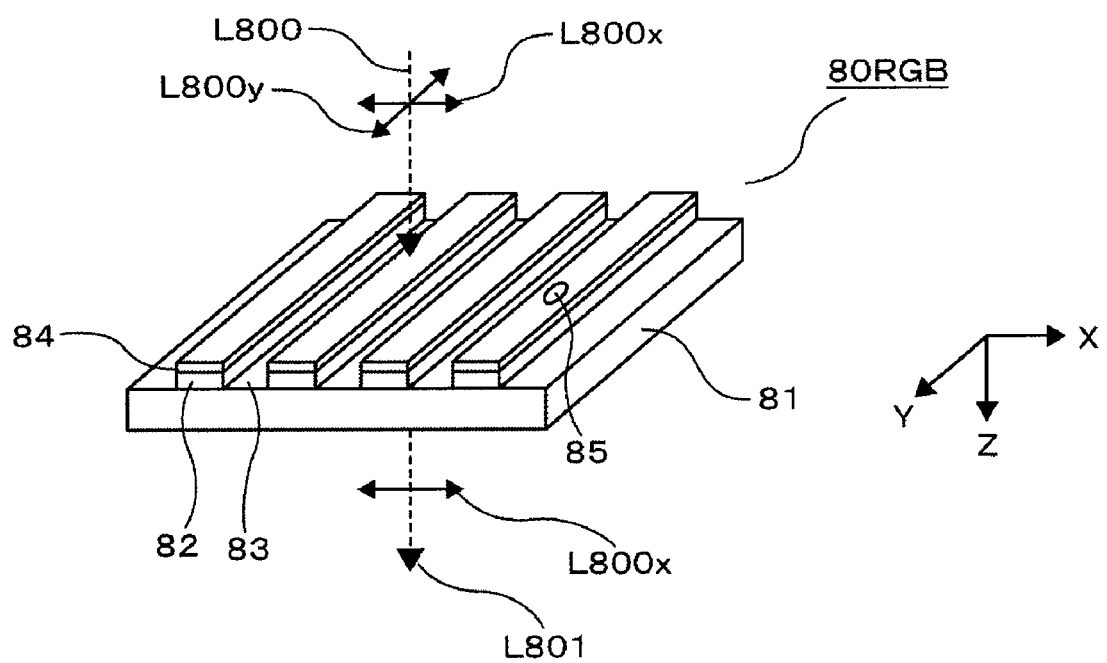
FIG. 5 shows an example structure of an output polarizing plate.

FIG. 5 shows an example structure of the output polarizing plate 80RGB that is formed of an inorganic material with heat resistance and durability taken into consideration. The output polarizing plate 80RGB shown in FIG. 5 is an absorption-type inorganic polarizing plate having a wire grid type structure. The output polarizing plate 80RGB includes a translucent substrate (e.g. a glass substrate) 81. On the translucent substrate 81, a wire grid 82 having metallic thin film strips extending in the Y direction forming a stripe pattern is formed with an absorption layer 84 formed on each of the metallic thin film strips. The metallic thin film strips are periodically arranged to be mutually spaced apart by a groove 83 with the period being smaller than the wavelength of light (about several times to ten times smaller than the wavelength of light). The output polarizing plate 80RGB formed of an inorganic material as described above is superior in heat resistance and durability.

When incident light L800 enters the output polarizing plate 80RGB, Y-polarized light L800y which is polarized in parallel to the film strips of the wire grid 82 is absorbed by the absorption layer 84, whereas X-polarized light L800x which is polarized perpendicularly to the film strips of the wire grid 82 is transmitted through the output polarizing plate 80RGB to advance as transmitted light L801. Namely, the output polarizing plate 80RGB functions to transmit only the X-polarized light L800x that is polarized in the X direction perpendicular to the film strips of the wire grid 82. In FIG. 5, reference numeral 85 denotes a defect (for example, a pinhole) in the absorption layer 84. When the defect 85 is present, the incident Y-polarized light L800y is not completely absorbed and part of the light is transmitted. In the present embodiment, however, the output polarizing plate 80RGB is spaced distantly from the liquid crystal panels, so that the defect 85, if present, is not projected on the display screen.

As described above, according to the configuration of the first embodiment, even if a defect such as a pinhole is present in the output polarizing plate 80RGB, the image displayed on the screen is not degraded. Since the output polarizing plate 80RGB is used commonly for the light of the three colors, the projection-type liquid crystal display device can be made smaller.

Second Embodiment

In the first embodiment described in the foregoing, the output polarizing plate 80RGB used commonly for R, G, and B light is disposed on the output side of the photosynthesis prism 200. In a second embodiment, an output polarizing plate 80RG used commonly for R light and G light is disposed on the output side of the photosynthesis prism 200 and an output polarizing plate 80B for B light is disposed immediately downstream of the liquid crystal panel 60b. The reasons for this are as follows.

(1) When, as shown in FIG. 2B, displaying black with the output polarizing plate 80RGB disposed on the output side of the photosynthesis prism 200, the B light and the R light passes the dichroic films formed in the photosynthesis prism 200 and most of the B light and the R light leaks into the opposing liquid crystal panels 60R and 60B, respectively. This causes the liquid crystal panels 60R and 60B to be heated, making it necessary to devise a measure to cool them.

(2) Of the light of the three colors emitted from a same light source, the B light has the largest energy. The B-light path including the liquid crystal panel 60B is, therefore, provided with a cooling means (cooling fan) more powerful than that provided for the R-light path including the liquid crystal panel 60R. Disposing the output polarizing plate 80B for B light immediately downstream of the liquid crystal panel 60B prevents the B light from leaking into the liquid crystal panel 60R, so that the cooling means for the R-light path can be simplified.

(3) In cases where the output polarizing plates 80 are disposed immediately downstream of the liquid crystal panels 60, the effects of defects like pinholes in the output polarizing plates 80 on the image projected on the display screen are most serious with the G light. This is because, among the light of the three colors, the G light has the highest visibility. Therefore, disposing the output polarizing plate 80RG used commonly for the R light and the G light on the output side of the photosynthesis prism 200 while disposing the output polarizing plate 80B for the B light immediately downstream of the liquid crystal panel 60B can minimize the effects of defects such as pinholes in the output polarizing plates.

Figure 3A:
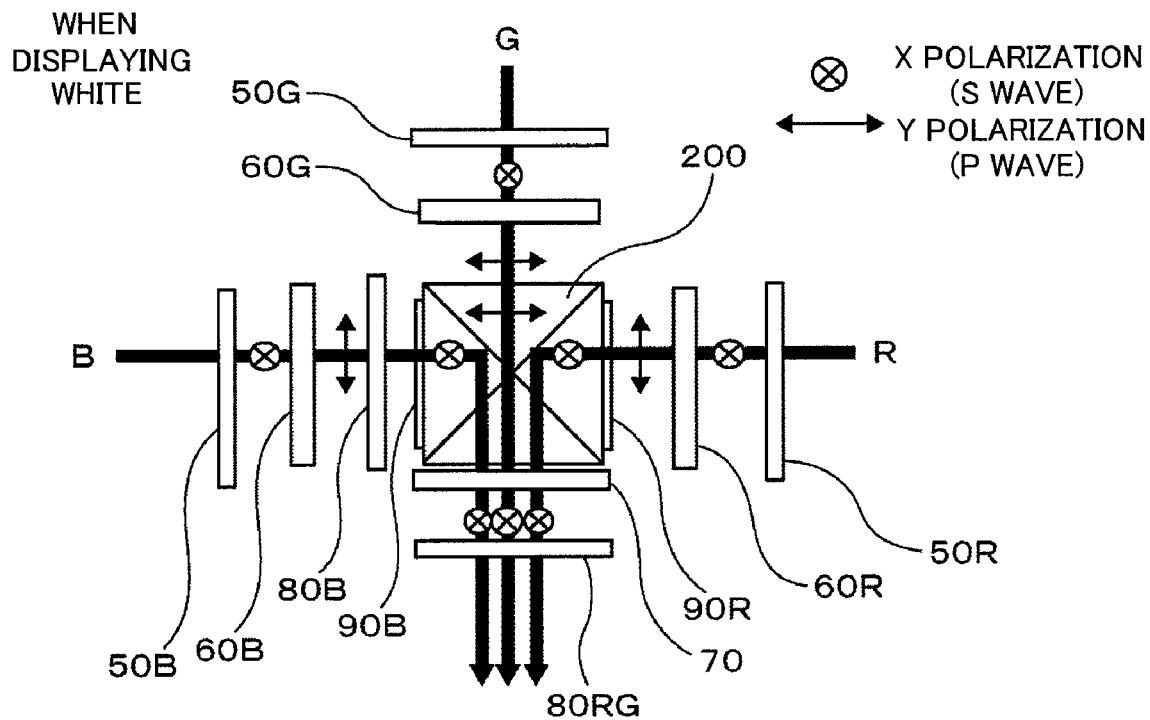
FIGS. 3A and 3B are detailed configuration diagrams of a portion around liquid crystal panels of an optical unit according to a second embodiment.
Figure 3B:
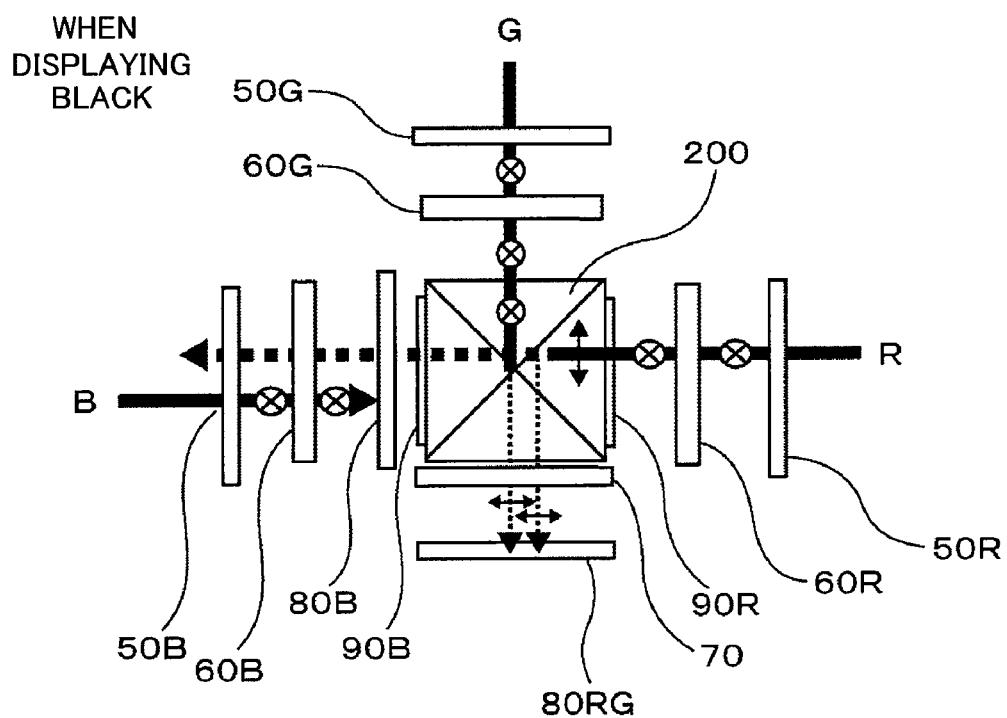

FIGS. 3A and 3B are detailed configuration diagrams of a portion around the liquid crystal panels of the optical unit according to the second embodiment of the present invention. The output polarizing plate 80B for the B light is disposed between the liquid crystal panel 60B and the photosynthesis prism 200, whereas the output polarizing plate 80RG common for the R light and G light is disposed on the output side of the photosynthesis prism 200. In FIG. 3A, how the light of the three colors is polarized when white is displayed is shown. In FIG. 3B, how the light of the three colors is polarized when black is displayed is shown.

When white is displayed as shown in FIG. 3A, Y-polarized (P wave) optical images of the three colors are formed on the liquid crystal panels 60 (60R, 60G, and 60B), respectively. The optical images thus formed are inputted to the photosynthesis prism 200. For this, unnecessary X-polarized components of the B light are removed beforehand by the output polarizing plate 80B that transmits light in the Y direction. The output polarizing plate 80B is equivalent to the absorption-type inorganic polarizing plate 80RGB described in the foregoing with reference to FIG. 5 with its transmission axis changed from the X direction to the Y direction. The R light and the B light is converted into X-polarized (S wave) light by the $\lambda/2$ wave plates 90R and 90B before being inputted to the photosynthesis prism 200. The light of the three colors inputted to the photosynthesis prism 200 undergoes SPS synthesis therein. When the synthesized light is outputted from the photosynthesis prism 200, the Y-polarized (P wave) G light is converted into X-polarized (S wave) light by the color selective polarization rotator 70 described in the foregoing with reference to FIG. 4. With this done, the light of all the three colors is aligned as X-polarized (S wave) light. Subsequently, the light of the three colors is inputted to the projection lens 300 after unnecessary Y-polarized (P wave) components are removed by the output polarizing plate 80RGB that transmits light in the X direction.

When black is displayed as shown in FIG. 3B, the incident X-polarized (S wave) light of the three colors is outputted as it is from the liquid crystal panels 60 (60R, 60G, and 60B). The B light outputted from the liquid crystal panel 60B is absorbed by the output polarizing plate 80B that transmits light in the Y-direction, so that the B light does not reach the photosynthesis prism 200. The X-polarized (S wave) G light passes the photosynthesis prism 200 as it is to be then converted into Y-polarized (P wave) light by the color selective polarization rotator 70. The G light thus converted into Y-polarized light (P wave) then enters the output polarizing plate 80RG. The R light enters the photosynthesis prism 200 after being converted into Y-polarized (P wave) light by the $\lambda/2$ wave plates 90R. Even though part of the R light thus inputted to the photosynthesis prism 200 is reflected by the dichroic films formed in the photosynthesis prism 200, most of the R light advances linearly to leak into the opposing liquid crystal panel 60B. The part of the R light reflected by the dichroic films passes the color selective polarization rotator 70 and enters the output polarizing plate 80RG. The output polarizing plate 80RG that transmits light in the X direction blocks the Y-polarized (P wave) G light and the part of the Y-polarized (P wave) R light.

As described above, when black is displayed, the B light heading for the photosynthesis prism 200 is blocked by the output polarizing plate 80B, so that the B light does not leak into the opposing liquid crystal panel 60R. The R light, on the other hand, linearly passes the photosynthesis prism 200 and leaks into the opposing liquid crystal panel 60B. The liquid crystal panel 60B for the B light and the output polarizing plate 80B are each provided with a powerful cooling means to reduce heat generation. Therefore, even if the R light, whose energy is smaller than that of the B light, leaks into them, it does not cause any problem regarding heat generation.

As described above, according to the configuration of the second embodiment, with the visibility of the B light being lower than that of the G light, even if a defect such as a pinhole is present in the output polarizing plate 80B for the B light, the image displayed on the screen is not significantly degraded. Hence, the projection-type liquid crystal display device can be made smaller without requiring the existing cooling means to be enhanced.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical unit comprising:
   an illumination optics system which outputs substantially white light aligned in a predetermined polarization direction,
   a light separation optics system which separates the substantially white light into light of three colors R, G, and B,
   liquid crystal panels for R, G, and B light, respectively, which form R, G, and B optical images by optically modulating polarized R, G, and B light according to a video signal,
   a photosynthesis prism which optically synthesizes the optical images, and
   a projection lens which enlarges and projects the synthesized optical images; wherein:
   a common output polarizing plate for R and G light is disposed on an output side of the photosynthesis prism and only an output polarizing plate for B light is disposed between the liquid crystal panels and the photosynthesis prism, and
   a color selective polarization rotator which rotates polarization of light of a selected wavelength band is disposed between the photosynthesis prism and the common output polarizing plate.

2. The optical unit according to claim 1;
   wherein a $\lambda/2$ wave plate is provided on an incident surface, among incident surfaces of the photosynthesis prism, for each of the R light and the B light, and
   wherein the color selective polarization rotator rotates polarization of the G light.

3. The optical unit according to claim 1;
   wherein the common output polarizing plate is an inorganic polarizing plate.

4. A projection-type liquid crystal display device comprising the optical unit according to claim 1, a drive circuit, a cooling fan, and a power supply circuit.

* * * * *